UNITED STATES PATENT OFFICE.

OTTO PROELSS, OF KANSAS CITY, MISSOURI.

APPARATUS FOR THE MANUFACTURE OF SULFURIC ACID.

989,537.

Specification of Letters Patent.

Patented Apr. 11, 1911.

Original applications filed May 10, 1907, Serial No. 372,980, and December 11, 1908, Serial No. 467,087. Divided and this application filed March 28, 1910. Serial No. 552,082.

*To all whom it may concern:*

Be it known that I, OTTO PROELSS, a citizen of the United States, and resident of Kansas City, county of Jackson, State of Missouri, have invented certain new and useful Improvements in Apparatus for the Manufacture of Sulfuric Acid, of which the following is a specification.

Figure 1:
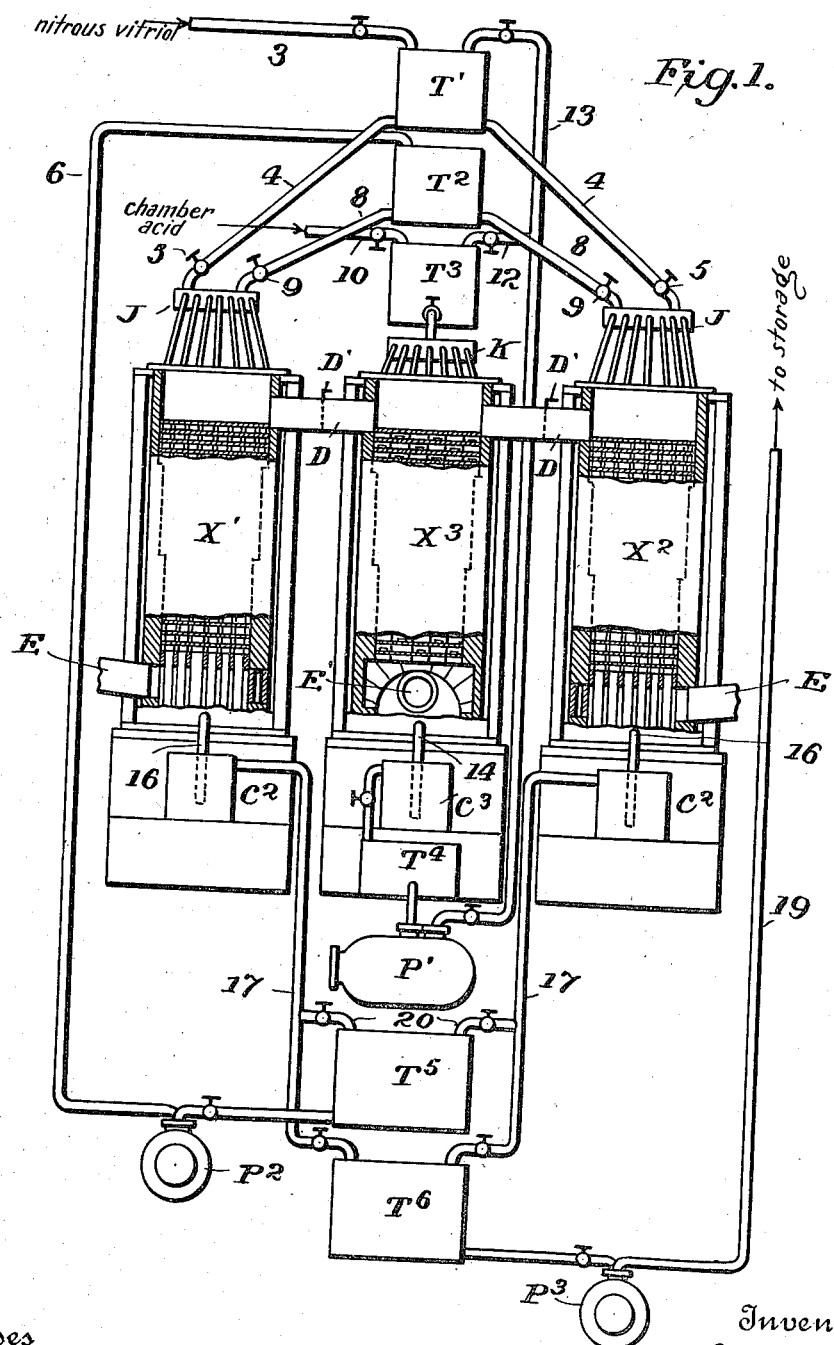
Figure 2:
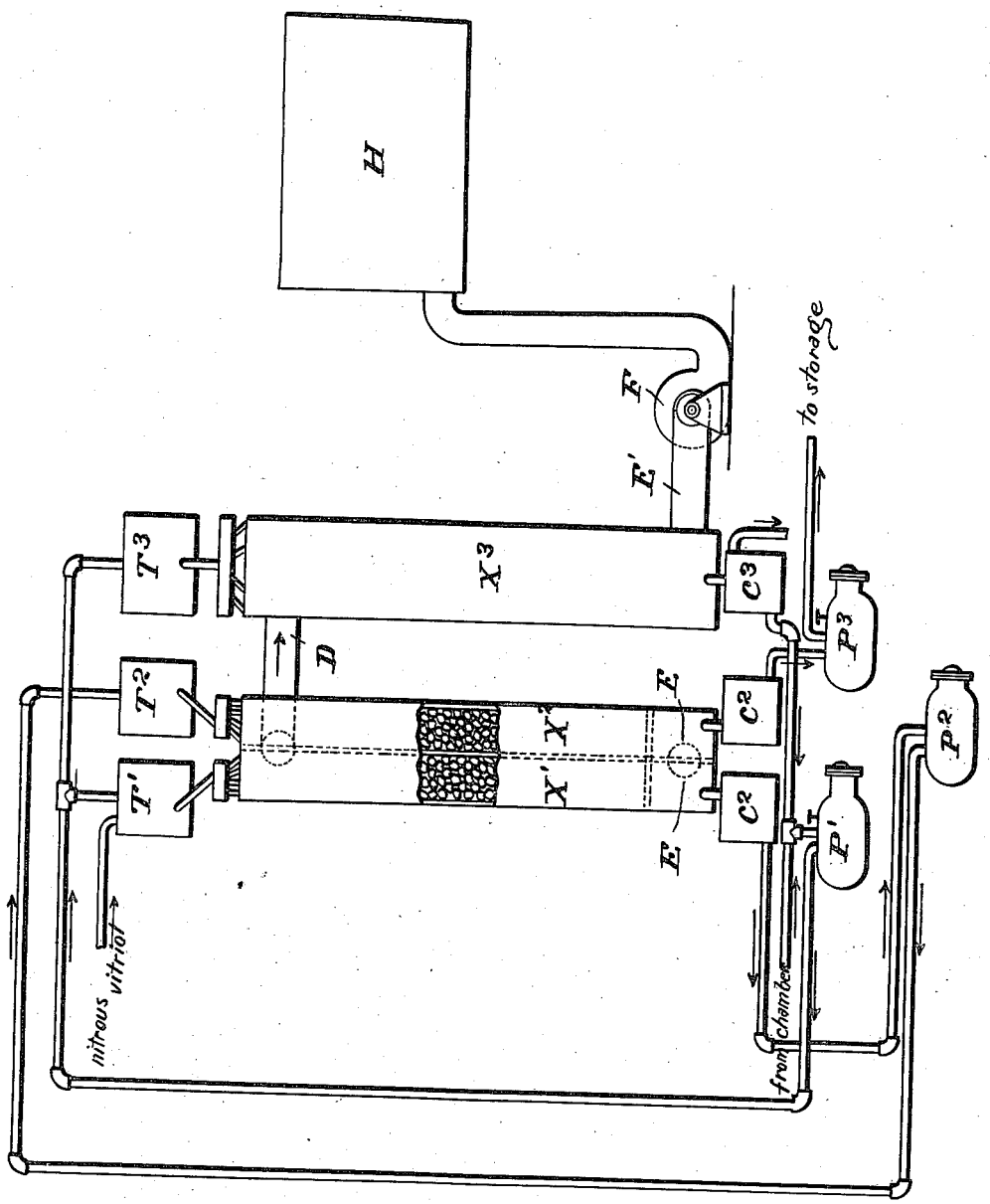

This invention relates to apparatus for making and concentrating sulfuric acid and is, so far as the invention illustrated in Figure 1 is concerned, a division of my earlier application No. 467,087, filed December 11, 1908, which application has now become Patent No. 963,175, dated July 5, 1910; and so far as the invention illustrated in Fig. 2 is concerned, a division of my prior application No. 372,980, filed May 10, 1907, which application has now become Patent No. 963,174, dated July 5, 1910, which patents claim the processes of making and concentrating sulfuric acid shown herein.

Many attempts have been made to produce sulfuric acid of a strength of 66° Bé. without the employment of an undue amount of labor and material, by the use of an ordinary sulfuric acid chamber and tower plant, but such attempts, so far as I am aware, have not resulted in such a saving of either labor or material as to render the processes and means employed desirable.

One of the objects of this invention is to construct an apparatus in which the acid may be highly concentrated.

Another object is to devise the apparatus so that the lead chambers will not be damaged.

Another object is to provide means whereby the impurities are removed from the acid.

Further objects will appear from the detailed description.

The invention will be described in connection with the accompanying drawings, in which—

Figure 1 is a diagrammatical view showing one form of this invention; Fig. 2 is another form of apparatus embodying some of the features of this invention.

Referring to Fig. 1, the apparatus consists of three chambers $X'$, $X^2$, $X^3$, which may be in independent towers, as shown in the drawings, or within a single structure in which they are separated by suitable partitions, and in said chambers are arranged in any manner which may be found most suitable masses of refractory material, as for instance chemical brick, the arrangement corresponding to such as is usually employed in what are known as "Glover" towers. Two of the chambers $X'$, $X^2$, are practically identical in their characteristics, and both of these chambers communicate through suitable conduits or pipes D with what is herein termed the intermediate chamber $X^3$, each of the said conduits being provided with a regulating valve $D'$. By means of suitable bonding material the lining of both of the chambers $X'$, $X^2$ may be arranged in such a manner that neither hot concentrated acid nor the hot gases will be able to destroy the lining. For convenience I term the chambers $X'$, $X^2$, the concentrating chambers, or chambers of the concentrating means, and the chamber $X^3$ the intermediate or mixing and cooling chamber without however intending to limit the construction to any particular arrangement of the chambers except such as will permit gases from either or both of the chambers $X'$, $X^2$ to be carried to the other chamber. Each of the concentrating chambers is provided with means whereby it may be supplied with burner gases, or sulfur dioxid, from burners, roasting furnaces, etc., which may be mixed with nitrogen peroxid in the usual way. As shown each of the said chambers has an inlet pipe E near the lower end, and the chamber $X^3$ has an outlet pipe $E'$, at the lower end; such pipe may communicate with a suitable exhaust fan like F shown in Fig. 2, that will propel the gases to the usual lead chambers. Means are provided whereby either of the concentrating chambers may be supplied with a nitrating material and with a weak acid, such supply being conducted alternately to the said chambers, and means are also provided whereby the liquid flowing from either chamber where denitration is effected is conducted to the top of the other chamber, which in such case constitutes the high concentration chamber, and means are also provided for supplying the intermediate chamber with a cold, weak acid solution, and the liquid from this chamber may be conducted upward by suitable means and mixed with the nitrating medium flowing to either of the concentrating chambers. In the apparatus shown in Fig. 1, there are three tanks $T'$, $T^2$, $T^3$, arranged at suitable elevations above all of the chambers, and one of the said tanks, as the tank T' is supplied through a pipe 3 with nitrous vitriol and has two discharge pipes 4, 4, provided with cocks or valves 5, leading to distributers J, above the concentrating chambers, said distributers having spray openings so as to discharge the liquid in fine jets into the chambers below. Another tank, as the tank $T^2$, is supplied, through the pipe 6 and through the medium of the pump $P^2$, with liquor from a tank $T^5$, and distributes the said liquor through pipes 8, 8, provided with cocks or valves 9, 9, to the distributers J, while the remaining tank $T^3$ receives a weak acid, or chamber acid, either through a supply pipe 10 or through a branch 12, leading from a pipe 13, into which liquor passing from the discharge pipe 14 of the intermediate chamber is pumped by means of a pump P', said pipe 13 also passing to the tank T', and between the discharge pipe 14 and the pump P' may be arranged a cooler $c^3$ and a reservoir or tank $T^4$. The discharged liquor from each of the concentrating chambers flows through a pipe or conduit 16, and may pass directly or through a cooler $c^2$ and pipe 17 to a tank $T^6$, and the pump $P^3$ serves to withdraw the liquid from the tank $T^6$ and pass it on through a pipe 19 to suitable storage tanks. The pipes 17 are also provided with branches 20 leading to the tank $T^5$. The tank $T^3$ may discharge its contents into a distributer K, which is above the chamber $X^3$ and discharges into the latter.

In the operation of the above described apparatus both of the concentrating chambers receive burner gases which pass through the same, and one of the chambers X', $X^2$, is fed with a mixture of weak acid and nitrous vitriol at such a rate regulated by one of the valves 5 that the acid will be discharged at the bottom at the usual strength (60 to 62° Bé.) The liquid is discharged from this chamber to tank $T^5$ and is then elevated through the pipe 6 to the tank $T^2$, and a portion thereof is discharged through one of the pipes 8 and distributer J into the other chamber where it is concentrated, the action being so regulated that the acid shall be concentrated to 66° Bé., or to any desired greater strength above that which is supplied to this chamber. To obtain this concentrated acid free from nitrogen compounds no nitrating material in any shape must be admitted to the chamber used for high concentration, the denitration being performed wholly in the other chamber. Therefore the burner gas flue leading to the chamber in which the concentration process is then performed is not supplied with nitrogen oxids. This may be accomplished in various ways, for instance, by shutting off the niter ovens through which the burner gases pass or cutting off the supply of the material which produces the nitrogen oxids. The gases issuing from the top of the denitrating chamber will be moderately warm and laden with nitrogen compounds, and passing to the chamber $X^3$ are mixed with the hot gases passing from the other chamber, and are cooled by the discharge of cold, weak acid from the distributer K, and the solution passing downward in the chamber $X^3$ and discharged therefrom may be pumped by the pump P' into either the tank T', to be used in connection with the nitrous vitriol in the de-nitrating chamber, or into the tank $T^3$ to be again employed in the intermediate chamber.

It will be noted that due to the high concentration of the acid in the tower or chamber which performs the function of the concentrating chamber the gases issuing therefrom will be very hot, while the gases issuing from the tower or chamber which performs the function of the de-nitrating apparatus will not be at such a high temperature. It is for the purpose of cooling down the hot gases issuing from the concentrating chamber that the tower or chamber $X^3$ is provided. In this tower the hot gases from the concentrating chamber will thoroughly mix with the gases from the de-nitrating chamber and the mixture is still further cooled down by the cool, weak acid percolating down the chamber $X^3$. The chamber $X^3$ therefore performs the function of a cooling apparatus. It is much easier to construct the lining of this chamber so as to resist the high temperatures and the strong acid than it is to provide the lead chambers which are of very large area in such a manner. The lining in X', and $X^2$ and $X^3$ is a special acid and heat resisting lining, and therefore will not be attacked by the hot gases and the strong acid, these hot gases being reduced in temperature before they enter the lead chambers so that no injury will result to the lining of these lead chambers. It will therefore be seen that this process splits the available burner gases into two parts, one which is used to de-nitrate the nitrous vitriol and concentrate the weak sulfuric acid formed in the chambers, and the other part of the burner gases is used to effect a further concentration of the 60° to 62° Bé. sulfuric acid thus produced. The gases resulting from the two parallel operations are then brought together and mixed in a subsequent intermediate tower or chamber before being admitted to the lead chambers and the Gay Lussac towers.

The above described operations may be performed alternately with the two chambers X', $X^2$, either of them acting as a denitrating chamber at the time that the other acts as a high concentrating chamber, and the liquid from each of the said chambers as well as that from the intermediate chamber $X^3$ is cooled by means of the coolers $c^2$, $c^3$, so as to be reduced to the proper working temperature.

In the manufacture of sulfuric acid it has been found that the principal impurities, especially iron, which are absorbed by the sulfuric acid circulating in the concentrating chambers will be separated and deposited in the said chambers as solid particles if the concentration is carried above approximately 64° Baumé. This deposit of the impurities will in time result in so clogging and obstructing the interstices of the material in the said chambers as to interfere with or prevent further operations, but it has been found that if a weaker solution is passed through the chamber in which such deposit has occurred the impurities will again be taken up and the chamber thereby cleansed or freed from obstructions.

It will be seen that by first concentrating the acid to a sufficiently high degree to insure the deposit of the impurities, and then discontinuing the high concentration in the chamber where such deposit occurs and bringing the weak acid into contact with said impurities, I am enabled to remove the deposit and restore the said chamber to its original effective condition while the deposit is taking place in the other chamber, from which it is then removed in like manner, and by thus alternating the action in the two chambers the desired concentration may be effected with a minimum expenditure of time and labor, all of the chambers being continuously in effective operation.

By means of the valves $D'$ the supply of the burner gases to the chambers $X'$, $X^2$, can be closely regulated, since the gases are drawn in by the suction fan shown more clearly in Fig. 2. By regulating the supply of the hot burner gases the concentration in the chamber which performs the function of a concentrating apparatus may be closely regulated. In the same manner the supply of burner gases passing through the denitrating chamber may also be closely regulated. In the operation of the process the supply of gases to the denitrating apparatus is cut down by one of the valves $D'$, while the other valve $D'$ is opened so as to permit greater volume of hot gases to pass through the concentrating apparatus and therefore permit greater concentration. It will therefore be seen that, when one of the chambers $X'$ or $X^2$ is converted from a concentrating apparatus to a denitrating apparatus, the supply of burner gases is reduced so as to cut down the concentration and therefore permit the nitrous liquid and the weak acid to dissolve the impurities during the denitrating operation of said chamber.

By the employment of the intermediate chamber the warm gases from the denitrating means and the hot gases from the high concentrating means are mingled together and their temperature reduced, and a further reduction is effected by the supply of cold weak acid, a certain amount of concentration being effected also in the said intermediate chamber.

Fig. 2 shows the towers $X'$ and $X^2$ as combined into a single structure. The operation of this apparatus will of course be very similar to that shown in Fig. 1 and some parts have been similarly lettered. In this apparatus, however, the acid supply is not shifted from $X'$ to $X^2$ but $X'$ always performs the function of the denitrating chamber, while $X^2$ performs the function of a concentrating chamber. In this construction the lead chambers are shown diagrammatically and indicated by the reference character H.

It is obvious that various changes may be made in the details of construction without departing from this invention, and it is, therefore, to be understood that this invention is not to be limited to the specific construction shown and described.

The process described in this application is not claimed herein, but is claimed in my Patents Nos. 963,174 and 963,175, granted July 5, 1910, which correspond respectively to applications Serial Nos. 372,980 and 467,087, hereinbefore referred to.

Having thus described the invention, what is claimed is:

1. In an apparatus for manufacturing concentrated sulfuric acid, in combination, a denitrating chamber, a concentrating chamber and a cooling apparatus, burner gas supply conduits connected to said chambers, means for discharging said gases from said chambers into said cooling apparatus and mixing them therein, and lead chambers arranged to receive the gases from said cooling apparatus.

2. In an apparatus for manufacturing concentrated sulfuric acid, in combination, a denitrating chamber, a concentrating chamber and a cooling chamber, burner gas supply conduits connected to said denitrating and concentrating chambers, means for discharging said gases from said chambers into said cooling chamber and mixing them therein, means for supplying weak acid to said cooling chamber, and lead chambers arranged to receive the gases from said cooling chamber.

3. In an apparatus for manufacturing concentrated sulfuric acid, in combination, a denitrating chamber, a concentrating chamber and a cooling chamber, burner gas supply conduits connected to said denitrating and concentrating chambers, means for discharging said gases from said chambers into said cooling chamber, means for supplying weak acid to said cooling chamber, lead chambers arranged to receive the gases from said cooling chamber, and means for conducting the dilute liquor from the cooling chamber into the denitrating chamber.

4. In an apparatus for manufacturing concentrated sulfuric acid, in combination, a denitrating chamber, a concentrating chamber and a cooling apparatus, burner gas supply conduits connected to said chambers, means for discharging said gases from said chambers into said cooling apparatus, lead chambers arranged to receive the gases from said cooling apparatus, means for conducting the denitrated liquor from the denitrating chamber into the concentrating chamber, and means for conducting the dilute liquor from the cooling chamber into the denitrating chamber.

5. In an apparatus for manufacturing concentrated sulfuric acid, the combination with a concentrating tower, of a plurality of acid supplies, means for connecting either of said supplies to said tower, means for supplying said tower with hot gases, and means for regulating the supply of said gases to said tower so as to regulate the concentration.

6. In an apparatus for manufacturing concentrated sulfuric acid, the combination with a concentrating tower, of a plurality of acid supplies, conduits between said supplies and said tower, regulating valves in said conduits, means for supplying said tower with hot gases, and means for regulating said gas supply.

7. In an apparatus for manufacturing concentrated sulfuric acid, the combination with a plurality of concentrating towers, of a plurality of acid supplies, means for connecting each of said towers with either of said supplies, and means for supplying said towers with hot gases.

8. In an apparatus for manufacturing concentrated sulfuric acid, the combination with a plurality of concentrating towers, of a plurality of acid supplies, conduits connecting each of said supplies with each of said towers, valves in said conduits, and means for supplying said towers with hot gases.

9. In an apparatus for manufacturing concentrated sulfuric acid, the combination with a plurality of concentrating towers, of a plurality of acid supplies, means for connecting each of said towers with either of said supplies, means for supplying said towers with hot gases, and means for regulating the supply of said gases.

10. In an apparatus for manufacturing concentrated sulfuric acid, the combination with a plurality of concentrating towers, of strong and weak acid supplies, means for connecting either of said towers to either of said supplies, and means for supplying hot gases to said towers.

11. In an apparatus for manufacturing concentrated sulfuric acid, the combination with a plurality of concentrating towers, of strong and weak acid supplies, means for connecting either of said towers to either of said supplies, means for conducting the acid discharged from said towers to at least one of said supplies, and means for supplying hot gases to said towers.

12. In an apparatus for manufacturing concentrated sulfuric acid, the combination with a plurality of concentrating towers, of strong and weak acid supplies, conduits for connecting said supplies to said towers, valves in said conduits, a main discharge tank, conduits connecting each of said towers to both said strong acid supply and said main discharge tank, valves in said conduits, and means for supplying hot gases to said towers.

13. In an apparatus for manufacturing concentrated sulfuric acid, the combination with a plurality of towers, of a plurality of supplies, one for strong acid and the other for nitrous liquor, means for connecting either supply with either of said towers, and means for supplying hot burner gases to said towers.

14. In an apparatus for manufacturing concentrated sulfuric acid, the combination with a plurality of towers, of a plurality of supplies, one for strong acid and the other for nitrous liquor, means for connecting either supply with either of said towers, means for supplying hot burner gases to said towers, and means for discharging the discharged acid of either tower into the strong acid supply.

15. In an apparatus for manufacturing concentrated sulfuric acid, the combination with a plurality of towers, of a plurality of supplies, one for strong acid and the other for nitrous liquor, means for connecting either supply with either of said towers, means for supplying hot burner gases to said towers, and means for regulating the supply of the burner gases so as to regulate the concentration.

16. In an apparatus for manufacturing concentrated sulfuric acid, the combination with a plurality of towers, of a plurality of supplies, one for strong acid and the other for nitrous liquor, conduits connecting each of said supplies with each of said towers, valves in said conduits, discharge conduits connecting said towers with said strong acid supply, and means for supplying hot burner gases to said towers.

17. In an apparatus for manufacturing concentrated sulfuric acid, the combination with a plurality of towers, of conduits for supplying each of said towers with strong acid and nitrous liquor, valves in said conduits, means for supplying hot burner gases to said towers, a cooling tower, means for discharging the gases from said towers into said cooling tower, and lead chambers connected to said cooling tower.

18. In an apparatus for manufacturing concentrated sulfuric acid, the combination with a plurality of towers, of conduits for supplying each of said towers with strong acid and nitrous liquor, valves in said conduits, means for supplying hot burner gases to said towers, a cooling tower, conduits for discharging the gases from said towers into said cooling tower, regulating valves in said conduits, and lead chambers connected to said cooling tower.

19. In an apparatus for manufacturing concentrated sulfuric acid, the combination with a plurality of towers, of conduits for supplying each of said towers with strong acid and nitrous liquor, valves in said conduits, means for supplying hot burner gases to said towers, a cooling tower, means for discharging the gases from said towers into said cooling tower, means for supplying weak acid to said cooling tower, and lead chambers connected to said cooling tower.

20. In an apparatus for manufacturing concentrated sulfuric acid, the combination with a plurality of towers, of a plurality of supplies, one for strong acid and the other for nitrous liquor, means for connecting either supply with either of said towers, means for supplying hot burner gases to said towers, a cooling tower, means for discharging the gases from said towers into said cooling tower, means for supplying weak acid to said cooling tower, and means for discharging the acid from said cooling tower into the nitrous liquor supply.

21. The combination of a structure having two independent similar concentrating chambers, means for conducting weak acid and a nitrating solution to the chambers alternately, and means for conducting the concentrated solution resulting from the denitrating operations in either chamber to the top of the other chamber.

22. The combination of a structure having two independent similar concentrating chambers, means for conducting burner gases to and from each chamber, means for conducting weak acid and a nitrating solution to the chambers alternately, means for conducting the concentrated solution resulting from the denitrating operations in either chamber to the top of the other chamber, and means for mixing together the gases passing simultaneously from both chambers and for subjecting them to the action of a cool weak acid solution.

23. The combination in an apparatus for manufacturing and concentrating sulfuric acid, of two similar concentrating means, means for supplying each with burner gases, a reservoir for nitrous vitriol, a reservoir for weak acid, conductors provided with valves between each reservoir to the two concentrating means, a reservoir connected to receive the discharge liquid from both concentrating means, and means for conducting the contents of the last named reservoir to the reservoir for weak acid.

24. The combination in an apparatus for making and concentrating sulfuric acid, of two independent concentrating chambers, a vitriol tank, a weak acid tank, independent conduits provided with valves between each tank and each chamber, a discharge conduit from each chamber, a tank arranged to receive the liquor from both conduits, and means for conducting the liquor from the last named tank to the weak acid tank.

25. The combination in an apparatus for making and concentrating sulfuric acid, of two independent concentrating chambers, a vitriol tank, a weak acid tank, independent conduits provided with valves between each tank and each chamber, a cooler for cooling the liquor discharged from each chamber, a tank connected to receive the discharge from each cooler, and means for conducting the liquor from the last named tank to the weak acid tank.

26. An apparatus having two concentrating chambers, means for admitting sulfuric acid to each and for supplying them alternately with nitrous liquor, and means for conducting the liquor passing from either chamber to the top of the other.

27. An apparatus having two concentrating chambers, means for admitting sulfuric acid to each and for supplying them alternately with nitrous liquor, means for conducting the liquor passing from either chamber to the top of the other, a third chamber connected to receive the gases from the other chambers, and means for supplying chamber acid to said third chamber.

28. An apparatus having two concentrating chambers, means for admitting sulfuric acid to each and for supplying them alternately with nitrous liquor, means for conducting the liquor from either chamber to the top of the other, a third chamber connected to receive the gases from the other chambers, means for supplying chamber acid to said third chamber, a tank receiving the liquid passing from the third chamber, and means for conducting the said liquid to either of the said three chambers.

29. An apparatus having two concentrating chambers, means for admitting sulfuric acid to each and for supplying them alternately with nitrous liquor, a third chamber, means for conducting the gases passing from either concentrating chamber to the third chamber, means for supplying chamber acid to said third chamber, a cooler and a tank receiving the liquid passing from the third chamber, and means for conducting the said liquid to either of the said three chambers.

30. The combination in an apparatus of the character described, of two concentrating chambers, an intermediate chamber, inlets for supplying burner gases to each concentrating chamber, conduits provided with valves between the concentrating chambers and the intermediate chamber, means for supplying weak acid and denitrating material to the concentrating chambers alternately, and means for conducting the liquor flowing from either concentrating chamber to the top of the other.

In testimony whereof I affix my signature in presence of two witnesses.

OTTO PROELSS.

Witnesses:
   B. D. ROWE,
   JOHN ADAMS.